(12) United States Patent
Kusase et al.

(10) Patent No.: US 7,462,968 B2
(45) Date of Patent: Dec. 9, 2008

(54) ELECTRIC WHEEL

(75) Inventors: Shin Kusase, Oobu (JP); Takuzou Mukai, Handa (JP)

(73) Assignee: Denso Corporation, Kariya (JP)

( * ) Notice: Subject to any disclaimer, the term of this patent is extended or adjusted under 35 U.S.C. 154(b) by 404 days.

(21) Appl. No.: 11/312,762

(22) Filed: Dec. 21, 2005

(65) Prior Publication Data
US 2006/0138879 A1    Jun. 29, 2006

(30) Foreign Application Priority Data
Dec. 27, 2004    (JP) .............................. 2004-378251

(51) Int. Cl.
*H02K 7/00*    (2006.01)
*H02K 3/00*    (2006.01)
(52) U.S. Cl. .................... 310/75 R; 310/75 C; 310/201
(58) Field of Classification Search ............... 310/67 R, 310/67 A, 75 R, 75 C, 156.49, 156.51, 156.52, 310/156.55, 216, 218, 186, 201, 208
See application file for complete search history.

(56) References Cited

U.S. PATENT DOCUMENTS

| | | | | |
|---|---|---|---|---|
| 4,677,328 A | * | 6/1987 | Kumakura | ................. 310/67 R |
| 5,442,250 A | * | 8/1995 | Stridsberg | ................... 310/186 |
| 6,002,187 A | * | 12/1999 | Ohkura et al. | ............ 310/67 A |
| 6,093,985 A | * | 7/2000 | Chen | ......................... 310/67 A |
| 6,278,216 B1 | * | 8/2001 | Li | ............................... 310/254 |
| 6,809,453 B2 | * | 10/2004 | Narita et al. | ................ 310/216 |
| 7,053,508 B2 | * | 5/2006 | Kusase et al. | ................. 310/64 |
| 7,135,800 B2 | * | 11/2006 | Yamada et al. | .............. 310/216 |
| 2004/0251651 A1 | | 12/2004 | Yamamoto et al. | |

FOREIGN PATENT DOCUMENTS

| | | |
|---|---|---|
| JP | A 08-289501 | 11/1996 |
| JP | A 2004-306733 | 11/2004 |

* cited by examiner

*Primary Examiner*—Tran Nguyen
(74) *Attorney, Agent, or Firm*—Oliff & Berridge, PLC

(57) ABSTRACT

The rotor of the outer-rotor type wheel-in motor of the electric wheel includes a field generator facing the outer surface of the stator across from an electrical gap. The field generator includes pole magnets magnetized in the radial direction with respect to the rotation axis of the wheel-in motor, adjacent two of the pole magnets having opposite directions of magnetization so that magnet polarity of the field generator alternates at a predetermined pole pitch along the circumferential direction, yoke magnets magnetized in the circumferential direction each of which is put between corresponding adjacent two of the pole magnets to strengthen magnetic field formed by the pole magnets, and a field generator support member to which the field generator is fixed, the field generator support member being fixed to the rotary shaft which is rotatably supported by a wheel suspension system of a vehicle.

7 Claims, 5 Drawing Sheets

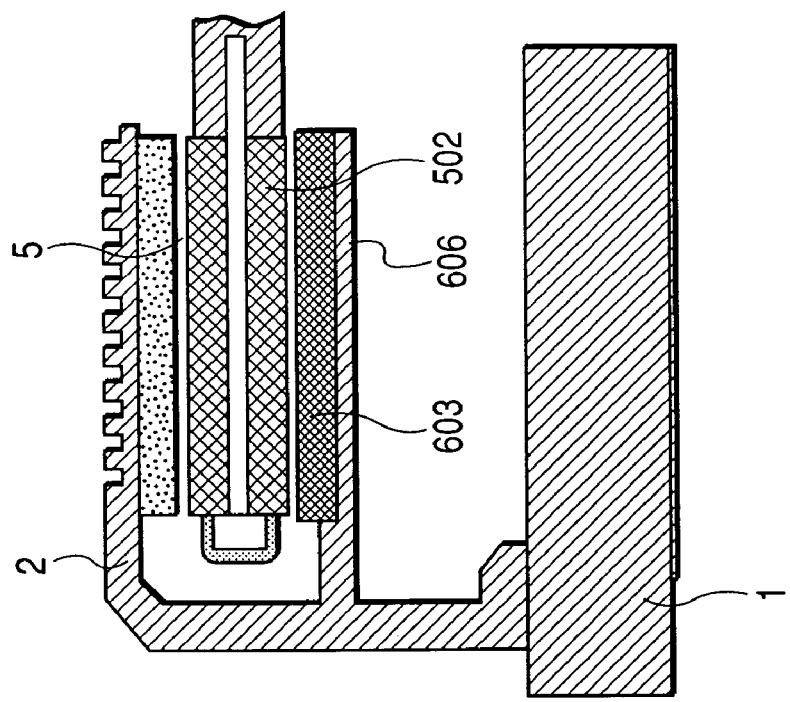
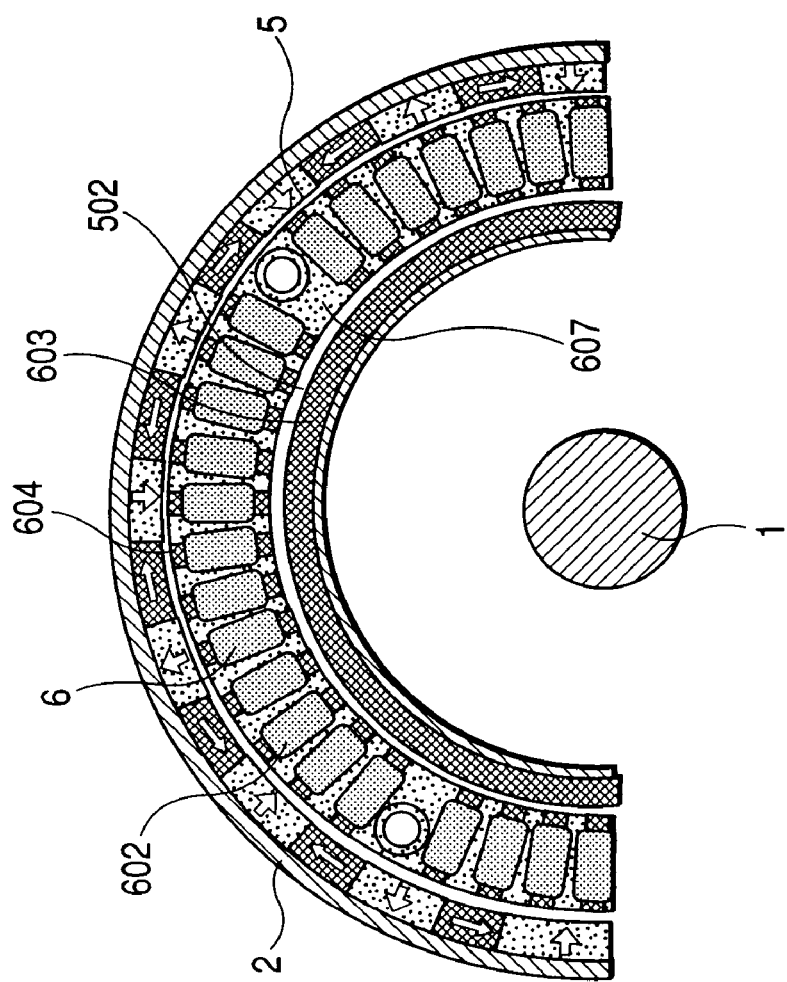
FIG. 2A
FIG. 2B

ELECTRIC WHEEL

CROSS-REFERENCE TO RELATED APPLICATION

This application is related to Japanese Patent Application No. 2004-378251 filed on Dec. 27, 2004, the contents of which are hereby incorporated by reference.

BACKGROUND OF THE INVENTION

1. Field of the Invention

The present invention relates to an electric rotating machine usable as a wheel-in motor for automobiles.

2. Description of Related Art

Recent years have seen a remarkable progress in electric motorization in automobile drive systems. In particular, much attention has focused on the "electric wheel". In this specification, the term "electric wheel" refers to a wheel of an automobile in which whole or parts of a stator and a rotor of an electric rotating machine for driving the wheel are built in this wheel.

Japanese Patent Application Laid-open No. 8-289501 proposes an inner-rotor type electric wheel in which a stator (armature) having a three-phase winding is disposed in a radially outer space of the wheel, and a magnet field type rotor is disposed in a radially inner space of the wheel. Japanese Patent Application Laid-open No. 2004-306733 proposes an outer-rotor type electric wheel in which a stator (armature) having a three-phase winding is disposed in a radially inner space of the wheel, and a magnet field type rotor is disposed in a radially outer space of the wheel.

However, the proposed electric wheels have a problem in that it becomes difficult to manufacture the wheel suspension system (wheel damper, for example) because of the increase of the unsprung mass resulting from the provision of the electric rotating machine. The provision of the electric rotating machine also pose a problem that the gear shift performance is degraded, because the rotational inertial mass of the wheel increases by that of the electric rotating machine.

To remove these problems, it is necessary that the electric rotating machine is reduced in weight. However, since reducing the weight of the electric rotating machine inevitably reduces its output power, it is difficult for the electric wheel to have both a sufficiently small inertial mass and a sufficiently large driving force. For such reason, no electric wheels are put to practical use in automobiles so far.

SUMMARY OF THE INVENTION

The present invention provides an electric wheel including:

a wheel rotatably supported by a wheel suspension system of a vehicle; and a wheel-in motor at least a part thereof is housed in the wheel to drive the wheel;

the wheel-in motor including:

a stator coupled to the wheel suspension system, and including an armature core having slots with tooth pieces formed therein at a predetermined pitch in a circumferential direction with respect to a rotation axis of the wheel-in motor, and armature coils fitted into the slots; and a rotor coupled to a torque transmission system for transmitting torque between the wheel-in motor and the wheel, and including a field generator facing an outer surface of the stator across from an electrical gap;

wherein the field generator includes pole magnets magnetized in a radial direction with respect to the rotation axis, adjacent two of the pole magnets having opposite directions of magnetization so that magnet polarity of the field generator alternates at a predetermined pole pitch along the circumferential direction, yoke magnets magnetized in the circumferential direction each of which is put between corresponding adjacent two of the pole magnets to strengthen magnetic field formed by the pole magnets, and a field generator support member to which the field generator is fixed, the field generator support member being fixed to a rotary shaft which is rotatably supported by the wheel suspension system.

With the present invention, the radial thickness of the rotor of the wheel-in motor can be reduced significantly, because the wheel-in motor is of the outer-rotor type, and the magnets of the field generator are arranged in the Halbach array. Accordingly, the diameter of the electric gap can be increased significantly, and the output power of the wheel-in motor can be therefore increased, because the output power of the electric rotating machine is proportional to the square of the diameter of the electric gap. In addition, when the diameter of the electric gap is large, thicker rectangular copper coils can be used, because the radial depth and circumferential width of the slots can be increased. As a result, the terminal resistance of the three-phase winding can be made smaller. This enables further increases of the output power of the electric wheel.

BRIEF DESCRIPTION OF THE DRAWINGS

In the accompanying drawings:

FIG. 2A is an axial half sectional view of an outer-rotor type wheel-in motor for use in an electric wheel according to a second embodiment of the invention;

FIG. 2B is a half front view of the wheel-in motor when viewed from the right side in FIG. 2A;

PREFERRED EMBODIMENTS OF THE INVENTION

Figure 1A:
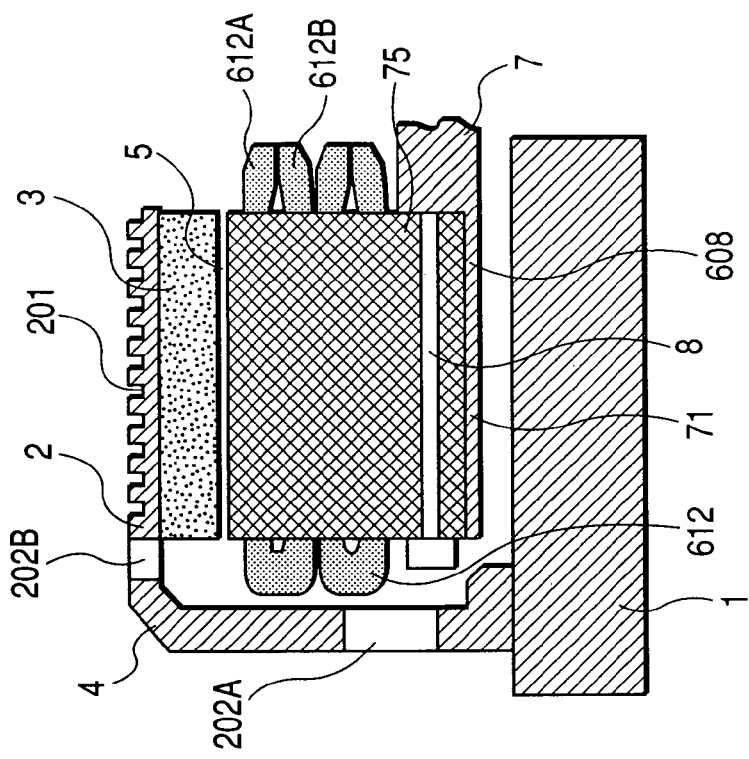
FIG. 1A is an axial half sectional view of an outer-rotor type electric rotating machine (wheel-in motor) for use in an electric wheel according to a first embodiment of the invention.
Figure 1B:
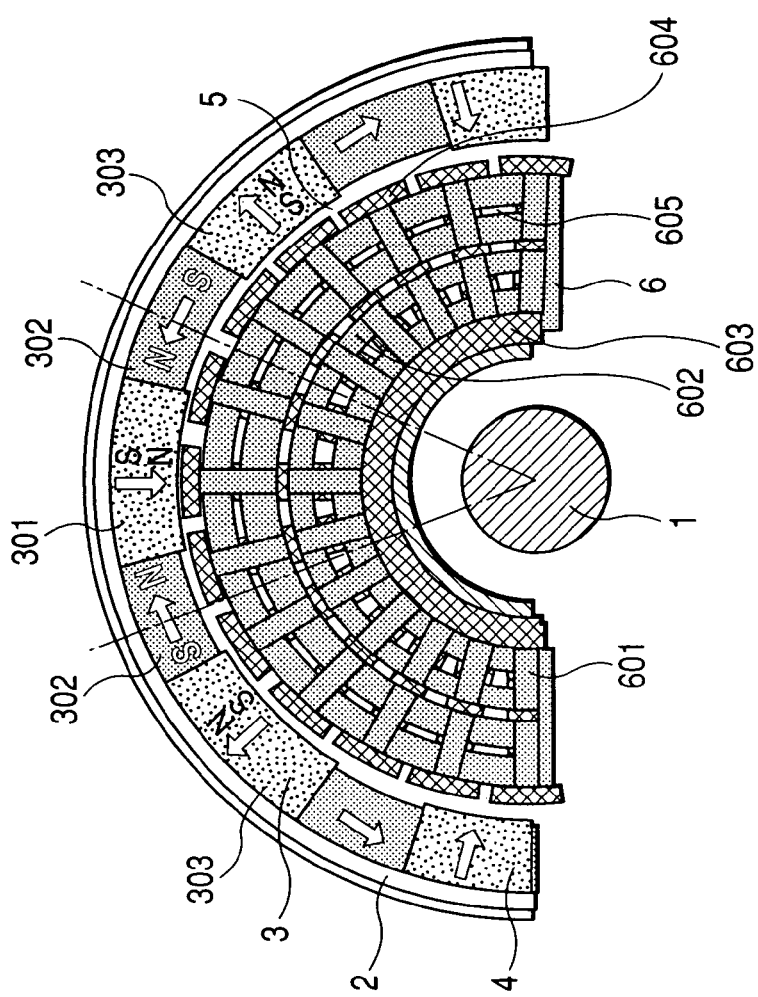
FIG. 1B is a half front view of the wheel-in motor when viewed from the right side in FIG. 1A.

FIG. 1A is an axial half sectional view of an outer-rotor type electric rotating machine (may be referred to as "wheel-in motor" hereinafter) for use in an electric wheel according to an embodiment of the invention. FIG. 1B is a half front view of the wheel-in motor when viewed from the right side in FIG. 1A.

The wheel-in motor includes a rotor 4 and a stator. The rotor 4 has a bowl-shaped member 2 fitted to a rotary shaft 1, and a cylindrical magnet-type field generator 3 fixed to the bowl-shaped member 2. The stator has an armature 6 and a frame 7 supporting the armature 6.

The Rotor 4

The bowl-shaped member 2, which is made of aluminum and has a thickness of about 2 mm and a diameter of 90 mm, is fitted to rotary shaft 1 having a diameter of 15 mm. The bowl-shaped member 2 is constituted by a disk part perpendicular to the axis of the shaft 1, and a cylindrical part connected to the limb of the disk part and extending in the direction along the axis of the shaft 1 (maybe referred to as "axial direction" hereinafter). The cylindrical part has radiating fins 201 formed in its outer surface. The disk part has air intake windows 202A formed therein for cooling and ventilating purpose. The cylindrical part has discharge windows 202B formed therein in the vicinity of the disk part. The cylindrical part is provided with, at its inner surface, the magnet-type field generator 3 constituted by a plurality of (16 in this embodiment) magneto-anisotropic neodymium magnets arranged in a Halbach array.

The Magnet-type Field Generator 3

The magnet-type field generator 3 includes a plurality of (four in this embodiment) N-pole magnets 301 serving as N poles of the field generator 3, a plurality of (four in this embodiment) S-pole magnets 303 serving as S poles of the field generator 3, and a plurality of (eight in this embodiment) yoke magnets 302 forming magnetic paths through which magnetic fluxes between the N and S poles flow.

The N-pole magnet 301 is made of a magnetic material having the magneto-anisotropic properties and a shape of longitudinally divided sections of a circular cylinder. The N-pole magnet 301 has a thickness in the radial direction of about 4 mm, a width in the circumferential direction of about 8 mm, and a length in the axial direction of about 35 mm. The N-pole magnet 301 is polarized in the radial direction such that its inner side with respect to the radial direction becomes the N pole. The S-pole magnet 303 is made of a magnetic material having the magneto-anisotropic properties and the same shape as the N-pole magnet 301. The S-pole magnet 301 is polarized in the radial direction such that its inner side with respect to the radial direction becomes the S pole. The S-pole magnets 303 apart from the N-pole magnets 301 by an electric angle of 180 degrees and the N-pole magnets 301 are located on the same circle. The yoke magnet 302 is made of a magnetic material having the magneto-anisotropic properties and a shape of longitudinally divided sections of the circular cylinder. The yoke magnet 302 has a thickness in the radial direction of about 4 mm, a width in the circumferential direction of about 4 mm, and a length in the axial direction of about 35 mm. The yoke magnet 302 is put between the N-pole magnet 301 and the S-pole magnet 303. The yoke magnet 301 is polarized in the circumferential direction such that one of its end surface with respect to the circumferential direction in contact with the N-pole magnet 301 becomes an N-pole, and the other in contact with the S-pole magnet 303 becomes an S-pole.

These yoke magnets 302, which serve as yokes of the magnet field type rotor having the magnet-type field generator 3 including the N-pole magnets 301 and the S-pole magnets 303, strengthen the magnetic field which the N-pole magnets 301 and the S-pole magnets 303 form in the armature 6 side. It should be noted that the numbers of the N-pole magnets 301, S-pole magnets 303, and yoke magnets 302 are determined as necessary. The inner diameter and the longitudinal length of the rotor 4 are about 78 mm and 40 mm, respectively. As explained above, the magnet-type field generator 3 does not include any iron core.

The Armature 6

The armature 6 includes a cylindrical armature core 601 and a three-phase winding 602 wound around the armature core 601.

The armature core 601, which is made by laminating electrical steel sheets having a thickness of about 0.35 mm, is located inside the rotor 4. The outer surface of the armature core 601 faces the inner surface of the magnet-type field generator 3 across from an electric gap 5 having a radial width of about 0.5 mm. The armature core 601 includes a back core part 603 having a radial width of about 4 mm, and tooth pieces 604 having a radial width of about 1.6 mm and extending outward from the back core part 603 in the radial direction. The back core part 603 has slots 605 formed therein at the same pitch in the circumferential direction as that of the tooth pieces 604. The circumferential width of the slots 605 is 2.4 mm. The coils of the three-phase winding 602 covered by insulating paper having a thickness of about 0.2 mm are fitted into the slots 605.

The Three-phase Winding 602

The three-phase winding 602 is formed by star-connecting (or delta-connecting) a required number of U shaped segment conductors each of which is made of a rectangular copper wire having a width of about 2 mm, a thickness of about 3 mm and a length of about 45 mm. Each segment electrode is fitted into two of the slots 605. More specifically, one of leg portions 612A, 612B of the segment electrode is inserted into one of the two slots apart from each other by an electric angle of 180 degrees and the other is inserted into the other of the two slots. Although 180-degree pitch corresponds to three-slot pitch in this embodiment, it may be changed as necessary. Each of the slots 605 contains four leg portions spatially shifted in the radial direction. Since the three-phase winding of the type described above is publicly known, no further explanation is made here. In this embodiment, the three-phase winding 602 has a star connection structure, and a terminal resistance of about 8 ohms. It should be noted that various different types of three-phase windings may be used for the armature 6.

The Stator

The armature core 601 has a center hole 608 extending along the axial direction formed in its radially inner portion. The frame 7 of the stator, which is made of a non-magnetic material (aluminum in this embodiment), supports the armature core 601. The frame 7 is fixed to a trailing arm (not shown) of a wheel damper of a wheel suspension system through a cover (not shown), the trailing arm being fixed to a bottom portion of a vehicle body through the wheel damper. The cover substantially encloses, together with the wheel, the wheel-in motor and a torque transmission mechanism for slowing down and transmitting a torque generated by the wheel-in motor.

The frame 7 has a tubular portion 71 formed at its end portion. The tubular portion 71 is pressed into the center hole 608 of the armature core 601. The frame 7 has a step portion 75 formed in one end of the tubular portion 71. The armature core 601 abuts against the surface of the step portion 75 of the frame 7 at its end surface. An internal threads extending in the axial direction is formed in the step portion 75. The armature core 601 is secured to the frame 7 by a bolt 8 which penetrates through a hole formed in the back core portion 603 and engages with the internal threads. The outer surface of the tubular portion 71 of the frame 7 and the inner surface of the center hole 608 may be splined to each other so that they rotate as one. The frame 7 supports the rotary shaft 1 by a bearing (not shown). The rotary shaft 1 is coupled to the wheel such that torque can be transmitted therebetween through a torque transmission system (not shown) including a gear mechanism or a belt mechanism.

The frame 7 is provided with a rotational position sensor (not shown) for detecting a rotational position of the rotor 4.

The three-phase winding 602 is supplied with three-phase AC power which an inverter device (not shown) generates from DC power drawn from a vehicle battery (not shown) on the basis of the rotational position of the rotor 4 detected by the rotational position sensor. Since the power supply control of the wheel-in motor is not different from that of conventional brushless DC motors, no further explanation is made here.

In this embodiment, the radial thickness of the rotor 4 can be made as thin as 12 mm, because the wheel-in motor is of the outer-rotor type, and the magnets arranged in the Halbach array are used for the magnet-type field generator. As a result, the diameter of the electric gap can be increased significantly, and the output power of the wheel-in motor can be therefore increased, because the output power of the electric rotating machine is proportional to the square of the diameter of the electric gap. With this embodiment where the external diameter of the wheel-in motor is 90 mm, and the diameter of the electric gap is 78 mm, the electric wheel can output twice the power which a conventional electric wheel having a wheel-in motor of the inner-rotor type can output. In addition, thanks to the large diameter of the electric gap, the radial depth and circumferential width of the slots can be increased, which enables using thicker rectangular copper coils. As a result, the terminal resistance of the three-phase winding can be made as small as 8 ohms (Commonly, it is several tens of ohms). This enables further increases the output power of the electric wheel.

Furthermore, since the rotor has not any yoke which is commonly large in specific gravity and in size, the mass and the inertial mass, which are very important characteristics of the electric wheel, can be reduced. This enables reducing vehicle weight and accordingly improving vehicle controllability.

On top of these, since the rotor 4 has lightweight radiating fins 201 made of aluminum, demagnetization due to temperature rise in the magnets can be eased. The radiating fins 201 may be provided spirally to obtain better cooling effect. It was found through experiment that the wheel-in motor of the electric wheel of the invention having an external diameter of 90 mm, an axial length of 70 mm and a mass of 1.3 kg exhibits a starting torque of about 40 Nm.

Second Embodiment

FIG. 2A is an axial half sectional view of an outer-rotor type wheel-in motor for use in an electric wheel according to a second embodiment of the invention. FIG. 2B is a half front view of this wheel-in motor when viewed from the right side in FIG. 2A.

In the second embodiment, unlike the first embodiment, the back core part 603 and the tooth pieces 604 are separated from each other, and the back core part 603 is provided on the rotor 4 side such that it faces the electric gap 502. More specifically, an annular part 606 extending in the axial direction is provided in the disk part of the bowl-shape member 2, and the back core part 603 is fixed to the annular part 606.

In the second embodiment, the tooth pieces 604 and the coils of the three-phase winding 602 of the armature 6 are bonded by an adhesive support 607 having good heat-conductivity to form the armature 6 in the shape of a cylinder. The coils of the three-phase winding can be wound around each of the tooth pieces 604 in a concentrated manner.

In the second embodiment, since the back core part 603 rotates together with the rotor 4, there occurs no core loss (iron loss). Accordingly, the wheel-in motor of the second embodiment can be a made as a low-loss rotating machine. In addition, the resistance of the three-phase winding can be lowered, because the heat emitted by the core and coils is dissipated through the adhesive support 607 having good heat-conductivity. This enables the wheel-in motor to have a smaller size, a higher output power, and a smaller inertial mass, to thereby reduce the unsprung mass.

Third Embodiment

Figure 3A:
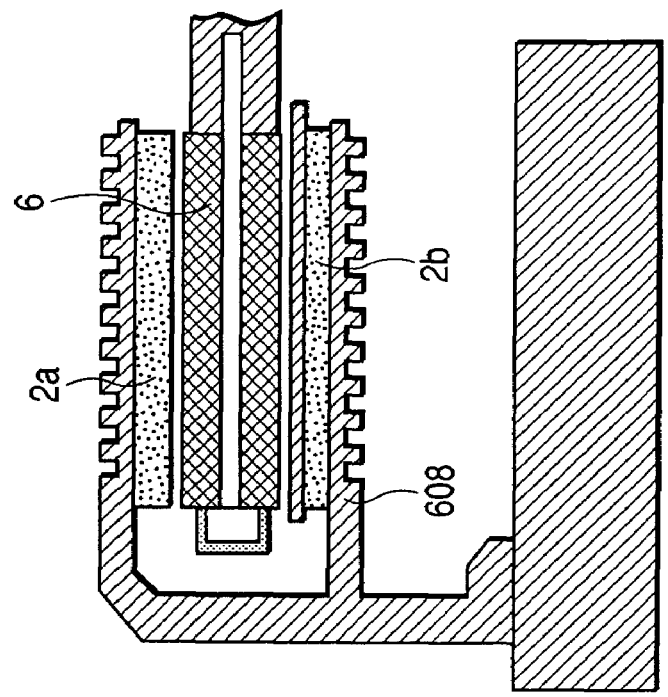
FIG. 3A is an axial half sectional view of an outer-rotor type wheel-in motor for use in an electric wheel according to a third embodiment of the invention.
Figure 3B:
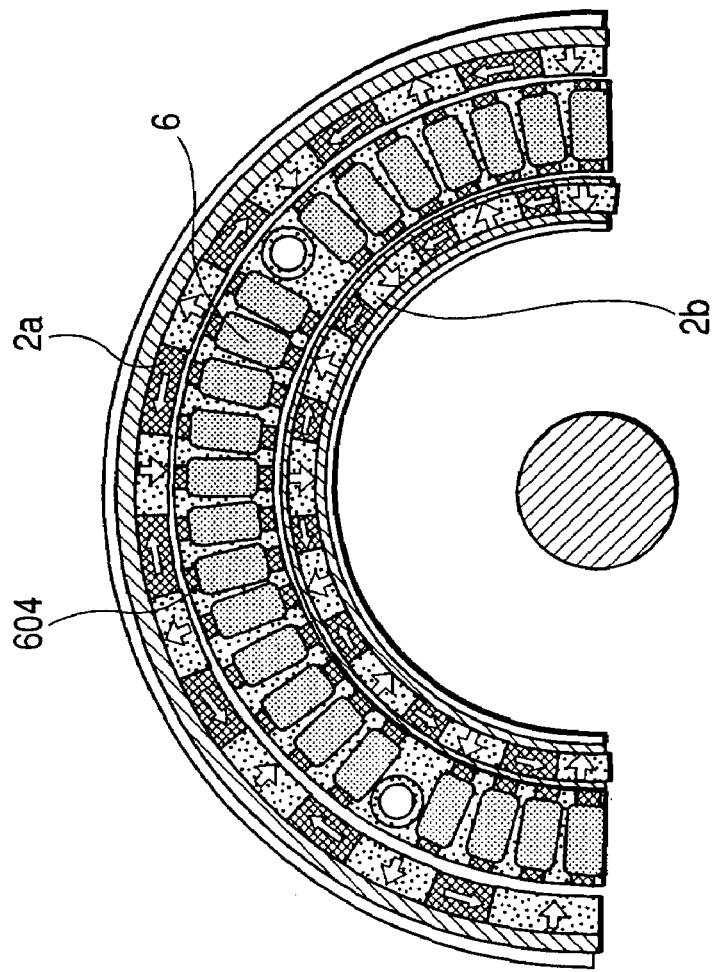
FIG. 3B is a half front view of the wheel-in motor when viewed from the right side in FIG. 3A.

FIG. 3A is an axial half sectional view of an outer-rotor type wheel-in motor for use in an electric wheel according to a third embodiment of the invention. FIG. 3B is a half front view of this wheel-in motor when viewed from the right side in FIG. 3A.

The third embodiment is different from the second embodiment in that the back core part 603 is replaced by a magnet-type field generator 2b in the shape of a cylinder constituted by magnets arranged in the Halbach array. The magnet-type field generator 2b is fixed to an annular part 608 similar to the annular part 606 explained in the second embodiment. Since the magnet-type field generator 2b is applied with centrifugal force, the magnet type field generator 2b is covered by a ring member made of non-magnetic or magnetically saturated material for the purpose of mechanical protection. Radiating fins similar to the radiating fins 201 explained in the first embodiment are provided in the inner surface of the annular part 608. The reference character 2a in FIG. 3A and FIG. 3B denotes a cylindrical magnet-type field generator having a structure similar to that of the magnet-type field generator 3 constituted by magnets arranged in the Halbach array. With the third embodiment, it is possible to increase the field strength, because the magnetomotive force is generated at both of the inner and outer sides of the armature 6.

The tooth piece 604 is made by laminating magnetic steel sheets having magneto-anisotropic properties such that it has an axis of easy magnetization along the radial direction, thereby allowing magnetic flux to flow in the radial direction. The third embodiment offers the advantages of low core loss in the armature 6, high magnetic flux density, and low copper loss because of increase of the circumferential width of the slots resulting from the reduction of the circumferential width of the tooth pieces 604. These enable the wheel-in motor to have a still smaller size, a still higher output power, and a still smaller inertial mass, to thereby further reduce the unsprung mass.

Next, the operation of the electric wheel including one of the wheel-in motors described above is explained.

Figure 4:
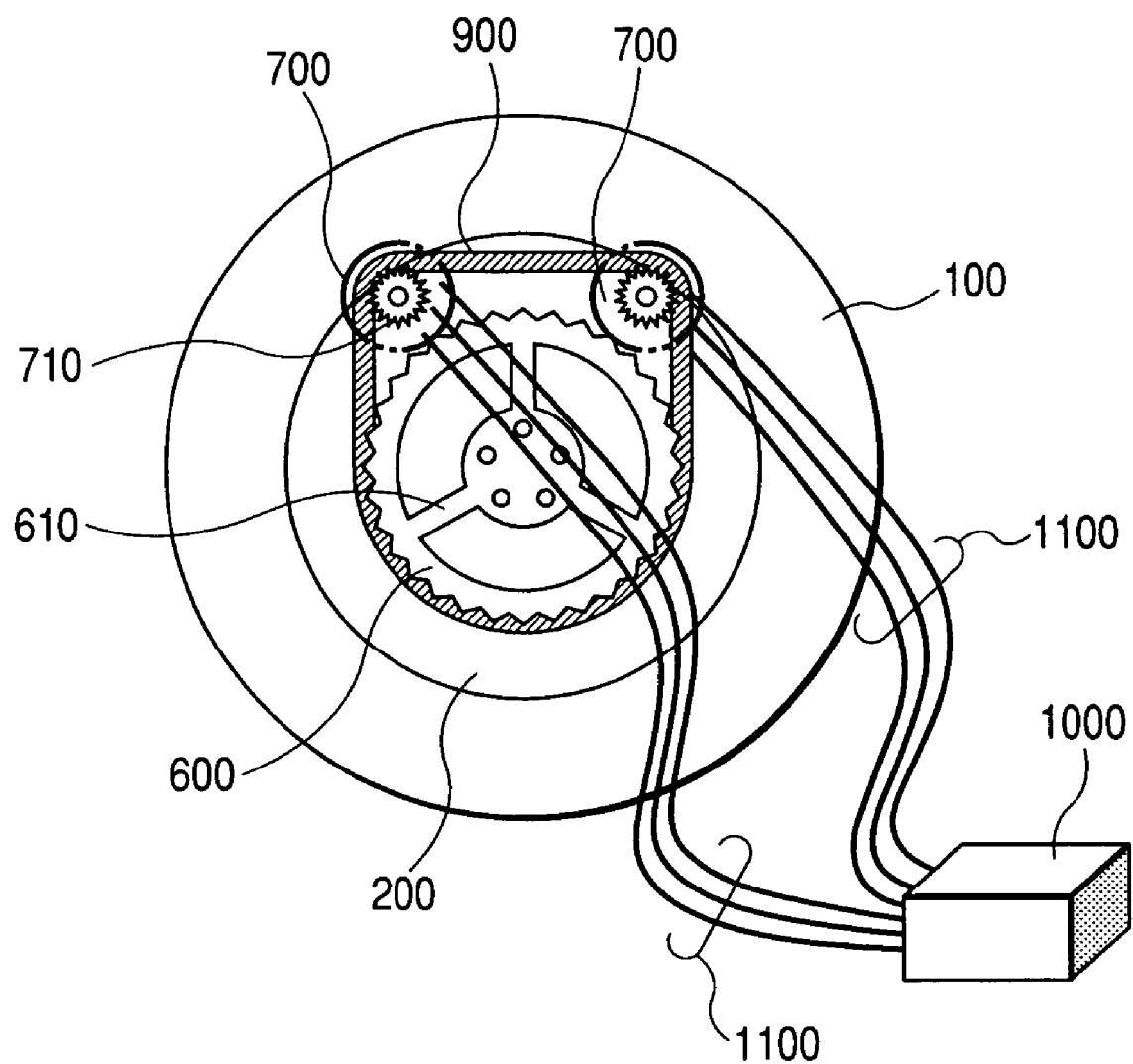
FIG. 4 is a diagram showing an electric wheel of the invention seen from an inner side of a vehicle.

FIG. 4 is a diagram showing the electric wheel seen from an inner side of a vehicle. In this figure, a brake device is omitted from illustration.

The reference numeral 100 denotes a tire, 200 denotes a wheel, 600 denotes a driven sprocket secured to a brake drum together with the wheel 200, and 610.denotes a fixing hub of the sprocket 600. The electric wheel has two wheel-in motors denoted by the reference numeral 700 each of which is provided with a driving sprocket 710 at its rotary shaft. The electric wheel may be provided with three or more wheel-in motors. The reference numeral 900 denotes a cogged belt for transmitting a power generated by the wheel-in motors 700 to the driven sprocket 600, 1000 denotes an inverter device including two sets of three-phase inverters for driving the two wheel-in motors 700 individually, 1100 denotes two sets of three-phase cables for electrically connecting the inverter device 1000 to the two wheel-in motors 700.

The wheel 200, driven sprocket 600, and brake drum are rotatably supported by an axle bearing housed in the wheel 200, the axle bearing being fixed to a trailing arm through an intercalated support cover (not shown). The trailing arm is suspended to a bottom portion of a vehicle body. The armature 6 of the wheel-in motor is fixed to the trailing arm through the intercalated support cover. The rotor of the wheel-in motor and a torque transmission device are substantially enclosed by the intercalated support cover and the wheel 200.

The two wheel-in motors 700, which are made as the same three-phase synchronous machine of the magnet-rotor type, rotate in the same direction and at the same rotational speed to drive the driven sprockets 600 in the same direction through the cogged belt 900 to thereby drive the wheel 200.

Figure 5:
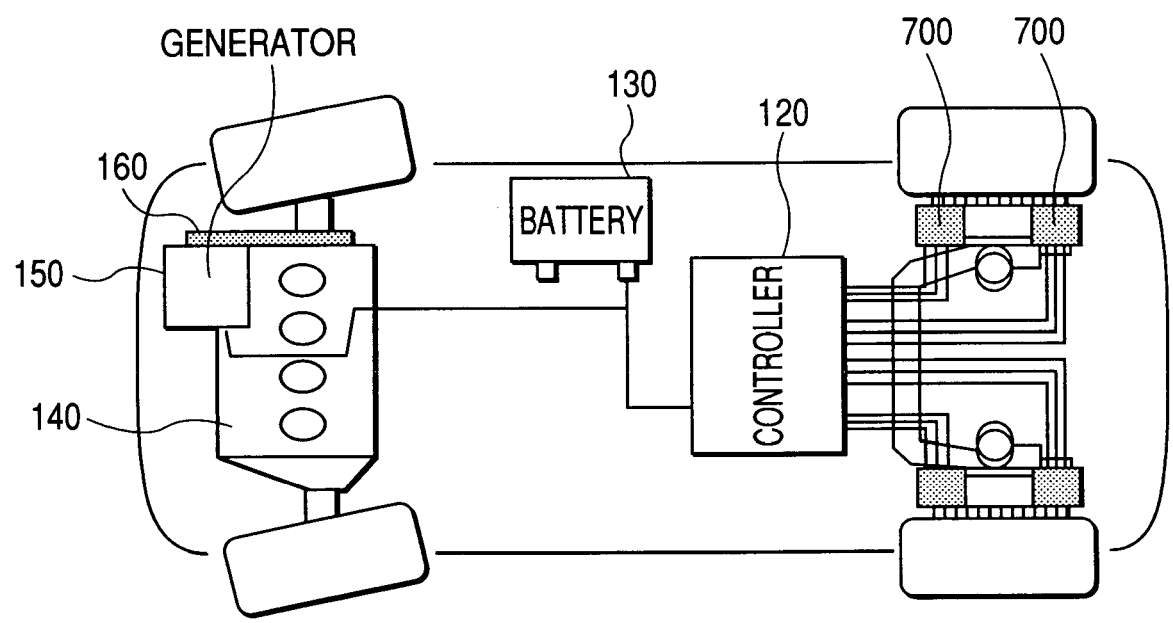
FIG. 5 is a diagram schematically showing a drive system of a vehicle having the electric wheels of the invention.

FIG. 5 is a diagram schematically showing a drive system of a vehicle having the electric wheels of the invention. In this figure, the reference numeral 120 denotes a controller for controlling the inverter device 1000 included therein, 130 denotes a vehicle battery supplying the wheel-in motors 700 with electric power through the inverter device 1000, 140 denotes an internal combustion engine (vehicle engine), 150 denotes a generator driven by the engine 140 through a belt 160 to generate electric power which is accumulated in the battery 130. The controller 120 selects one of an electrically driven mode and a power generating mode (regenerative braking mode) in accordance with a running state of the vehicle. In the electrically driven mode, the wheel-in motors 700 are supplied with electric power from the generator 150 and the battery 130 through the inverter device 1000. In the power generating mode, the electric power generated by the wheel-in motors 700 is accumulated in the battery 130 or is used to drive the generator 150. The controller 120 also controls the generator 150 depending on which of the electrically driven mode and the power generating mode is selected. Each of the front wheels is driven by the engine 140 through a torque transmission mechanism (not shown), while each of the rear wheels is driven by the two wheel-in motors 700.

The above explained preferred embodiments are exemplary of the invention of the present application which is described solely by the claims appended below. It should be understood that modifications of the preferred embodiments may be made as would occur to one of skill in the art.

What is claimed is:

1. An electric wheel comprising:
a wheel rotatably supported by a wheel suspension system of a vehicle; and
a wheel-in motor at least a part thereof is housed in said wheel to drive said wheel;
said wheel-in motor including:
a stator coupled to said wheel suspension system, and including an armature core having slots with tooth pieces formed therein at a predetermined pitch in a circumferential direction with respect to a rotation axis of said wheel-in motor, and armature coils fitted into said slots,
wherein each of said armature coils is formed by a U shaped segment conductor having two leg portions, a distance between said two leg portions being equal to said predetermined pole pitch, a plurality of said two leg portions of said armature coils being connected to one another at a side of one of end surfaces of said armature core with respect to said rotating axis so as to form a three-phase winding,
a rotor coupled to a torque transmission system for transmitting torque between said wheel-in motor and said wheel, and including a field generator facing an outer surface of said stator across from an electrical gap,
wherein said field generator includes pole magnets magnetized in a radial direction with respect to said rotation axis, adjacent two of said pole magnets having opposite directions of magnetization so that magnet polarity of said field generator alternates at a predetermined pole pitch along said circumferential direction, yoke magnets magnetized in said circumferential direction each of which is put between corresponding adjacent two of said pole magnets to strengthen magnetic field formed by said pole magnets, and
a field generator support member to which said field generator is fixed, said field generator support member being fixed to a rotary shaft which is rotatably supported by said wheel suspension system.

2. The electric wheel according to claim 1, wherein each of said pole magnets has an easy magnetization axis along said radial direction, and each of said yoke magnets has an easy magnetization axis along said circumferential direction.

3. The electric wheel according to claim 1, wherein said rotor includes a back core part serving as a yoke of said armature core, said back core part being fixed to said field generator support member and facing said tooth pieces across a second electric gap.

4. An electric wheel comprising:
a wheel rotatably supported by a wheel suspension system of a vehicle; and
a wheel-in motor at least a part thereof is housed in said wheel to drive said wheel;
said wheel-in motor including:
a stator coupled to said wheel suspension system, and including an armature core having slots with tooth pieces formed therein at a predetermined pitch in a circumferential direction with respect to a rotation axis of said wheel-in motor, and armature coils fitted into said slots,
a rotor coupled to a torque transmission system for transmitting torque between said wheel-in motor and said wheel, and including a first field generator and a second field generator, and
a field generator support member to which said first and second field generators are fixed, said field generator support member being fixed to a rotary shaft which is rotatably supported by said wheel suspension system,
wherein said first field generator, facing an outer surface of said stator across from a first electrical gap, includes first pole magnets magnetized in a radial direction with respect to said rotation axis, adjacent two of said first pole magnets having opposite directions of magnetization so that magnet polarity of said first field generator alternates at a predetermined pole pitch along said circumferential direction, first yoke magnets magnetized in said circumferential direction each of which is put between corresponding adjacent two of said first pole magnets to strengthen magnetic field formed by said first pole magnets, and
wherein said second field generator, facing radially inner ends of said tooth pieces across a second electric gap, said second field generator includes second pole magnets magnetized in said radial direction, adjacent two of said second pole magnets having opposite directions of magnetization so that magnet polarity of said second field generator alternates at said predetermined pole pitch along said circumferential direction, and second yoke magnets magnetized in said circumferential direction each of which is put between corresponding adjacent two of said second pole magnets to strengthen magnetic field formed by said second pole magnets.

5. The electric wheel according to claim 4, wherein each of said second pole magnets has an easy magnetization axis along said radial direction, and each of said second yoke magnets has an easy magnetization axis along said circumferential direction.

6. The electric wheel according to claim 4, wherein each of said first pole magnets has an easy magnetization axis along said radial direction, and each of said first yoke magnets has an easy magnetization axis along said circumferential direction.

7. The electric wheel according to claim 4, wherein said rotor includes a back core part serving as a yoke of said armature core, said back core part being fixed to said field generator support member and facing said tooth pieces across a second electric gap.

* * * * *